United States Patent
Artman et al.

(10) Patent No.: US 10,409,685 B2
(45) Date of Patent: Sep. 10, 2019

(54) RECOVERY OF APPLICATION FUNCTIONS VIA ANALYSIS OF APPLICATION OPERATIONAL REQUESTS

(71) Applicant: Uber Technologies, Inc., San Francisco, CA (US)

(72) Inventors: Tuomas Santeri Artman, San Francisco, CA (US); Naveen Narayanan, Daly City, CA (US); Bruce McLaren Stanley, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 142 days.

(21) Appl. No.: 15/658,304

(22) Filed: Jul. 24, 2017

(65) Prior Publication Data

US 2019/0026184 A1    Jan. 24, 2019

(51) Int. Cl.
*G06F 11/14* (2006.01)
*G06F 11/07* (2006.01)

(52) U.S. Cl.
CPC ........ *G06F 11/142* (2013.01); *G06F 11/0709* (2013.01); *G06F 11/079* (2013.01); *G06F 11/0751* (2013.01); *G06F 11/0793* (2013.01); *G06F 11/0757* (2013.01)

(58) Field of Classification Search
CPC .. G06F 11/079; G06F 11/0793; G06F 11/142; G06F 11/143; G06F 11/302
USPC ................................. 714/38.1, 47.1
See application file for complete search history.

(56) References Cited

U.S. PATENT DOCUMENTS

| | | | |
|---|---|---|---|
| 6,922,796 B1* | 7/2005 | Matena | G06F 11/0709 714/48 |
| 7,506,241 B2* | 3/2009 | Chefalas | G06F 11/0715 714/37 |
| 2009/0292959 A1 | 11/2009 | Melamed | |
| 2009/0328098 A1 | 12/2009 | Beyabani | |
| 2015/0099510 A1 | 4/2015 | Shah et al. | |
| 2015/0193296 A1* | 7/2015 | Chen | G06F 11/079 714/15 |

(Continued)

OTHER PUBLICATIONS

PCT International Search Report and Written Opinion, PCT Application No. PCT/IB2018/055227, dated Oct. 31, 2018, 14 pages.

*Primary Examiner* — Joseph R Kudirka
(74) *Attorney, Agent, or Firm* — Fenwick & West LLP

(57) ABSTRACT

An application recovery system is configured to recover an application executing on a client device by determining that an application is operating abnormally and providing recovery instructions to the application. The application executing on a client device includes a main portion of the application and a recovery portion of the application. The recovery portion of the application sends requests for recovery instructions to a network system. The network system receives the recovery requests and analyzes operational requests generated by the main portion of the application to identify failing functions and their associated software packages. The recovery instructions are determined based on the identified failing functions and their associated software packages and sent to the client device. The client device applies the recovery instructions to modify the application such that the application recovers normal operation.

14 Claims, 5 Drawing Sheets

| | Vince's Client Device 100a | Alice's Client Device 100b | Nick's Client Device 100c | Mary's Client Device 100d |
|---|---|---|---|---|
| Functions 210 | A | A | A, B | C |
| Software Packages 220 | 1, 2 | 1 | 1, 3 | 2 |
| Request Recovery 230 | | | | |
| Expected Requests 240 | θ | | θ | α |
| Actual Requests 250 | α | γ | | α |
| Determine Recovery Instructions 260 | Φ | Δ | Φ | |

(56) References Cited

U.S. PATENT DOCUMENTS

2017/0346842 A1* 11/2017 Giral .................. H04L 63/1425

* cited by examiner

|  | Vince's Client Device 100a | Alice's Client Device 100b | Nick's Client Device 100c | Mary's Client Device 100d |
|---|---|---|---|---|
| Functions 210 | A | A | A, B | C |
| Software Packages 220 | 1, 2 | 1 | 1, 3 | 2 |
| Request Recovery 230 | | | | |
| Expected Requests 240 | θ | | θ | α |
| Actual Requests 250 | α | γ | | α |
| Determine Recovery Instructions 260 | Φ | Δ | Φ | |

FIG. 2

RECOVERY OF APPLICATION FUNCTIONS VIA ANALYSIS OF APPLICATION OPERATIONAL REQUESTS

FIELD

This description relates generally to restoring functionality of an application executing on a device and more particularly for detecting, determining, and correcting abnormal software packages executing on the device to restore functionality of the application.

DESCRIPTION OF RELATED ART

Client devices and their installed applications provide various functions to a user through the execution of software packages included in the application. For example, an application can provide a function to connect users to coordinate travel by providing the ability to access information on the internet, send messages between users, etc. When the client devices and applications are modified, these modifications may affect execution of the application and cause the functions of the application to become abnormal, preventing effective completion of the applications operational goals.

In some instances, malfunctioning applications can go unrecognized by the user allowing the applications to operate in sub-optimal conditions and prevent the application to realize full functionality. In more detrimental cases, malfunctioning can be recognized by the user but the malfunctions themselves prevent a user from restoring the application. Therefore, it is desirable to provide a method to automatically detect and correct failing functions of an application.

SUMMARY

An application recovery system (also referred to herein as "a system" for simplicity) recovers an application by taking actions to identify abnormal application operation and return the application to correct operation. Application recovery is challenging in an environment where disparate client devices operate the same application to provide the same function but are dissimilarly configured. As an example, two client devices provide the same function with a first client device including the application with a first set of software packages and the second client device includes the application with a second set of software packages. Each application through the installed software package(s) generates a set of operational requests to a server in communication with the application recovery system in service of providing the function of the application. For example, to provide an application for coordinating travel between a rider and a provider, a rider's device may generate operational requests to specify the location of the rider, query for a destination, display map data, and so forth. To identify and correct a failing function and determine a set of recovery instructions, the system identifies installed software packages for a device and the operational requests generated by the device.

According to examples herein, to determine the set of recovery instructions, the network system first identifies abnormal operation of the application. Abnormal operation of the application indicates that there is at least one failing function associated with the application. The network system can identify abnormal operation by, for example, analyzing the generated operational requests of executing software applications. The client device sends a request for recovery instructions, including the installed software package(s) (or identifier(s) of the installed software package(s)) to the network system to aid in identifying the failing function(s).

The network system identifies expected operation of the application using the received installed software packages (or identifiers of the installed software packages). Based on the identified expected operation, the network system identifies the failing function(s) and their associated software package(s) that may be affecting operation of the application. The identification can be based on any information included in the system such as the recovery requests, the client device datastore, the software package data store, or the recovery instruction datastore.

The network system determines a set of recovery instructions for the requesting client device based on the identified failing function, the associated software packages, and/or any other information in the environment for the application's operation. In one example, the recovery instructions can disable, modify, or delete software packages when executed by the client device. When determining the set of recovery instructions, the network system may also modify a set of recovery instructions for other requests having similar software packages. After determining the set of recovery instructions, the network system provides the recovery instructions to the requesting client device. The requesting client device applies the recovery instructions to the client device and application such that the application is recovered.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

FIG. 2 is a table of several client devices and their associated functions and operational requests that are used to determine a set of recovery instructions to recover an application, in accordance with some example embodiments.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Modern client devices can accomplish a wide range of functions in an almost any type of environment. Functions are achieved by applications executing on the client devices. In the context of this description, a function represents the high-level operational goals of the application executing on a client device. In some instances, the application can malfunction and the client device may not provide (or incorrectly provide) the function of the application in the environment. Determining the cause of the malfunction on individual client devices is difficult in an environment where several client devices 100 execute the same application and provides the same function but each client device has a different version of the application installed.

Figure 1:
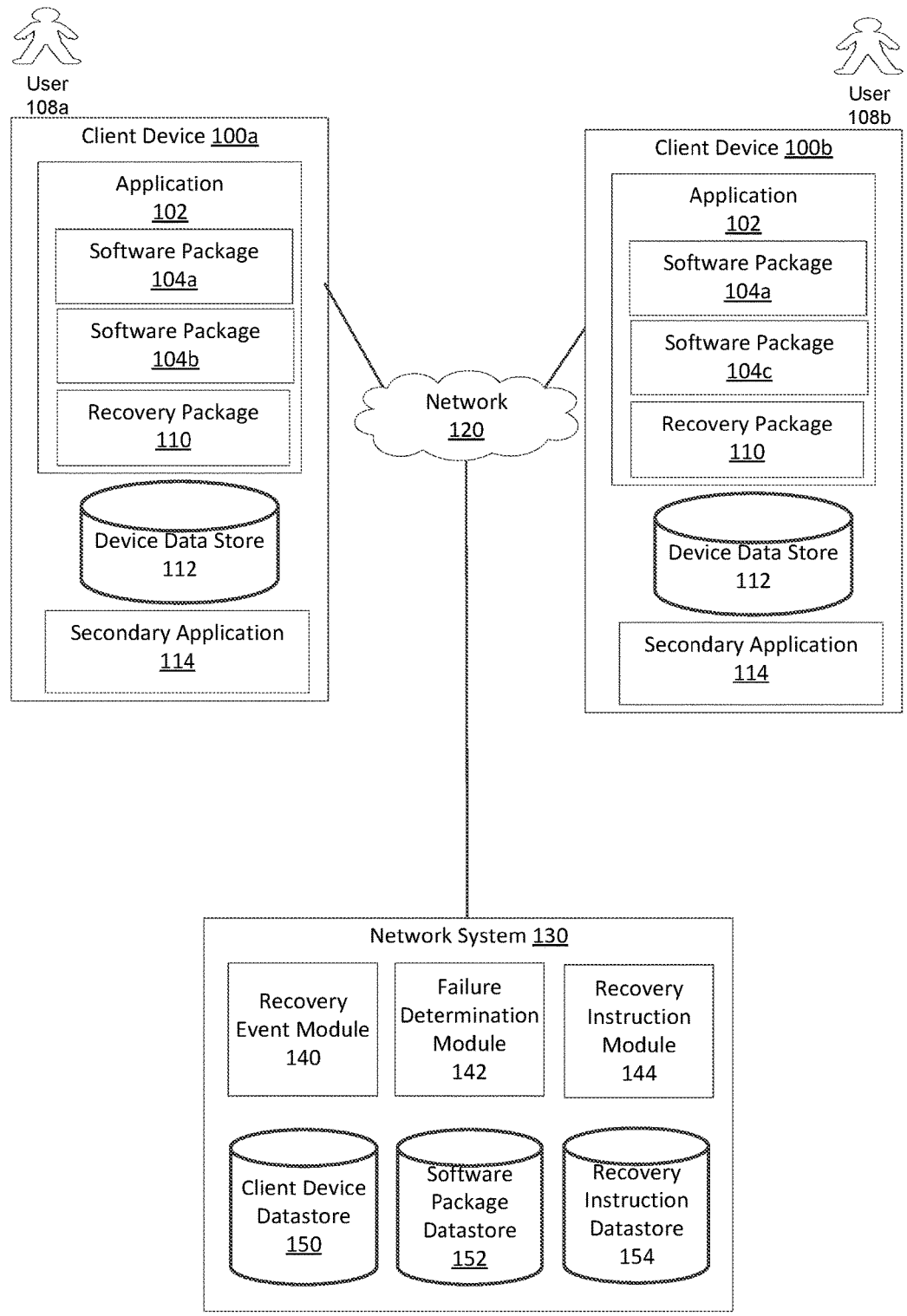
FIG. 1 is a high-level block diagram of a system environment for a travel coordination system with that can recover a malfunctioning application, in accordance with some embodiments.

FIG. 1 is a high-level block diagram of a system environment for recovering a malfunctioning application on a client device 100 via a network system 130, in accordance with some embodiments. FIG. 1 includes client devices 100, users 108, a network 120, and a network system 130. Alternate embodiments of the system environment can have any number of user devices 100, as well as multiple network systems 130. The particular functions performed by the various entities of FIG. 1 may vary in different embodiments. In one example, the system 130 can be used to coordinate travel between users, each user operating a respective user device 100.

Each client device 100 is a computing device used by one or more users 108 to execute application(s) 102. The client device 100, for example, can be a mobile computing system executing an application 102 that interacts with the network system 130 via the user interface of the client device 100. In other embodiments, the client device 100 is any other network-capable device.

When a user 108 operates a client device 100, an application 102 can perform any number of functions in the environment. In the context of this description, a function represents the high-level operational goals of the application 102 executing on a client device 100. For example, performing a function can be coordinating travel between users. Additionally, each application 102 can include any number of functions and each function can have any number of sub-functions. The sub-functions can be subdivisions of a function that in aggregate form a function. Using the example above, the function of coordinating travel between users can have the sub-functions of providing travel to a user and requesting travel from a user.

When an application is executing properly, the functions of the application provide the operational goal of the application. Conversely, in a malfunctioning application, the functions execute incorrectly and do not provide the operational goal of the application. In the context of this disclosure, correctly executing functions will be called nominal functions and incorrectly executing functions will be called failing functions. Similarly, applications that successfully provide the operational goal of the application are described as operating normally and applications that do not provide the operational goal of the application are described as operating abnormally.

The client devices 100 include software applications, such as application 102 and secondary application 114, which execute on the processor of the respective client device 100. The application 102 executing on the client device 100 performs a function (or functions) in the environment. The secondary application 114 can perform a function associated with the recovery of the application 102 (e.g., load a set of recovery instructions, or execute a set of recovery instructions). In some embodiments, the functionality of the secondary application 114 is included in the application 102. Additionally, the applications and recovery applications can communicate with one another and with network system 130 via the network 120. Examples of applications 102 (and 114) can be a transportation coordination application, a web browser, a social networking application, a messaging application, a gaming application, a media consumption application, etc. Each application 102 can be linked to a user account on the network system 130 associated with a client device 100, the client device user 108 or group of client device users.

The application 102 includes a number of software packages 104 for executing functions of the application. Software packages 104 enable the function of an application 102, affecting the various operational activities of the application as it executes in the environment. As referred to herein, software packages 104 are a set of computer instructions that operate on a processor of the client device 100. In some embodiments, a software package 104 can be implemented in hardware (e.g., a hardware comprising computational logic), firmware, and/or any other component allowing the execution of the software package 104. The software packages 104 represent one embodiment of the disclosed method, and other embodiments can include other software packages 104.

For example, a function of the application 102 executing on the first client device 100a is coordinating travel (e.g. a travel coordination application). The application 102 executing on the first client device 100b includes software packages 104a and 104b for executing the function of the travel coordination application. Providing more context, the software package 104a is associated with coordinating travel between users while software package 104b is associated with interfacing with the network, both of which are associated with the function of the application. In some cases, software packages can specify parameters for operation of the application (e.g., software settings) without affecting the operational activities of the application.

In other embodiments, various client devices 100 can run any number of similar or dissimilar software packages 102 to achieve the same function. In any of these implementations, the software packages 102 can be stored on the computer readable persistent storage devices of the client device, loaded into memory, and executed by the one or more processors of the client device's computers. For example, the application 102 executing on the second client device 100b is the transportation coordination application. The application 102 executing on the second client device 100b includes a similar software package 104a associated with coordinating travel. However, the application 102 executing on the second client device 100b includes a dissimilar software package 104c associated with interfacing with the network. In this example, because the devices 100 are different models, the software package associated with interfacing with the network on each device is dissimilar.

In alternative embodiments, applications 102 can lack the software packages 104 described herein and/or facilitate functionality among the software packages 104 in a different manner. In the described embodiments, a software package 104 is implemented as a standalone software package forming a part of application 102. However, software packages may also affect operation of application 102 without being a portion of the application itself. For example, the software package 104 affecting the application 102 may be a part of a larger more complex software package that also affects other applications. Likewise, the software package 104 may be one or more statically or dynamically linked libraries.

During operation of the application 102 a set of operational requests (e.g., receive location information, request transport provider, etc.) are typically generated and associated with the function of the application. These operational requests may be modified or affected by the software packages installed in a particular application. According to an example, a user operates the application 102 via an interface of the user device 100. The user device 100 (or corresponding application thereon) gathers data describing the execution of the software packages 104 and the operational requests that may or may not be generated. During normal operation, the correct execution of operational requests generated by software applications in aggregate perform a nominal function of the application in the environment.

Broadly, operational requests can be described as any operation of the application 102 that facilitates the execution of functions in the environment. These requests typically reflect the functioning of the application and requests from the application to other services or devices, such as requests to other components of the client device or requests to other systems on the network. As additional examples, the operational requests can include receiving input to the client device via the client device interface, producing output on the client device via the client device interface, any other client device interface interactions, a request to the server, an input from the server, a request to other software packages, an input from other software packages, a request to other applications, an input from other applications, a request to a database, an input from a database, an input from a component of a client device (e.g., antenna, user interface, speakers, etc,), or any other operational request that can be generated by the application in the environment.

Providing another example, the application 102 executing on the first client device 100*a* provides the function of coordinating transportation. The application 102 executing on the first client device 100*a* includes software packages 104 that when executed produces a set of operational requests that together allow a user 108 to interact with the network system 130 to coordinate transportation. In one example, the application 102 includes a software package 104*a* that when executed generates an operational request to determine the location of the client device. Additionally, the application 102 includes a software package 104*b* that when executed generates an operational request to request travel from the network system 130.

In some embodiments, though referred to generally as executing an operational request, operational requests for a given function or software package may be sent to the network system 130 as a series of communications from the user device 100 as a user 108 interacts with the interface. Similarly, operational requests may be sent in a piecewise manner during intra-device operational request execution. Likewise, the network system 130 can send recovery instructions to a client device 100 as a series of communications.

As previously described, the execution of a software package(s) 104 of an application 102 generates operational requests that in aggregate provide the nominal function of the application in the environment. Typically, during normal operation each software package 104 generates a specific set of operational requests when executed. These operational requests are termed expected operational requests. Expected operational requests can be determined using a variety of methods within the system. For example, a programmer of the application 102 can determine the expected operational requests prior to distribution of the application or software packages, the expected operational requests can be stored in the software package datastore, the user of a client device can set an expected operational request for the client device, the network system can perform a static analysis of software packages, the network system can receive a set of expected operational requests from another entity in the environment, the network system can build a set of expected operational requests based on nominally functioning client devices within the environment, etc. In some embodiments, the expected operational requests may also include a timing or ordering structure that indicates when expected operational requests occur.

However, if an application is operating abnormally the application can include at least one failing function. In some cases, a failing function is caused by software packages that are malfunctioning. These software packages are termed abnormal software packages. The abnormal software packages can generate operational requests that differ from the expected operational requests. In one example embodiment, there can be three types of differing operational requests: an additional operational request that is generated in addition to the expected operational requests (e.g., an excess operational request), an operational request that is generated in place of an expected operational request (e.g., a replacement operational request), and the lack of an operational request from the expected operational request (e.g., a missing operational request). For convenience, these operational requests are called abnormal operational requests in aggregate. Therefore, when an application is operating abnormally, it may generate abnormal operational requests that fail to provide the function of the application. In one example, abnormal operational requests are included in a crash report. In a similar embodiment, the network system can generate a crash report from the abnormal operational requests.

In some instances, the application can successfully provide the function normally while still producing abnormal operational requests. That is, the generated abnormal operational requests may not inhibit the operational goal of the application. In these cases, the abnormal operational requests can be viewed as inefficiently executing functions of the application in the environment. Although the function may still be provided (and there may not be an obvious error from the user's perspective), similar methods, such as those described herein can be used to identify and correct inefficient applications.

The application can also include a recovery software package 110. The recovery software package 110 requests and applies recovery instructions for the application 102. In one instance, the request and application of the recovery instructions occurs each instance the application is executed on the client device (e.g., during application loading). The recovery software package 110 may also monitor the operational requests of the application 102. These operational requests may be provided by the recovery software package 110 to the network system 130 as part of a request for recovery instructions. In alternative embodiments, the recovery software package can request and apply recovery instructions at any other time (e.g., based on input from a user, based on a received notification from the network system, based on a time threshold, based on information stored in the device data store, etc.).

In one example, the recovery software package 110 requests a set of recovery instructions from the network system 130 via the network 120. The set of recovery instructions can modify the function of the application when applied by the application 102, secondary application 114, or client device 100. For example, the recovery instructions modify the application (or client device) such that abnormal function returns to normal function.

According to an example, a request for recovery instructions is sent by recovery software package 110 to the network system 130 to determine abnormal function of the application 102. The request can occur at any point as the client device operates in the environment. In one example, the requests can include an application manifest, a device manifest, and any of the generated operational requests associated with the executing application. The application manifest can include the installed software packages of the application, the version number of the application, a list of operational requests that can be generated, application settings, etc. The device manifest can include a list of installed applications, display settings, and network settings, etc. Further, the requests can include information included in the device data store, the location of the client device, or previous recovery instructions executed by the recovery software packages.

The recovery software package 110 can receive a set of recovery instructions from the network system 130 to modify software packages 104 of the application. After executing the recovery instructions, the recovery software package 110, in some embodiments, determines whether the operational requests from the application 102 are now consistent with expected operational requests and can request a new set of recovery instructions from the network system 130 based on the determination. In these instances, the subsequent requests for recovery instructions can include information and operational requests associated with the previously executed recovery instructions.

The recovery instructions can include any number of instructions to recover the application 102. Some example instructions include: disabling, removing, or adding any number of software packages; modifying an installed software package; disabling, removing, modifying or adding to the functions provided by the application; removing, adding, or modifying information in the device data store (e.g., passwords, clearing caches etc.); accessing a secondary application to assist in restoring the application (e.g., opening a web browser to retrieve instructions for a user to perform); modifying the operational requests generated by a software package when executed, or any other instruction that can recover the application 102.

The recovery software package 110 can be viewed as a 'companion' or secondary portion to the 'main portion' of the application providing the intended function of the application. In this example, the main portion of the application relates to and includes the software packages associated with executing one or more functions of the application. That is, the recovery software package 110 executes within the application 102 but the functions provided by the software packages 104 do not affect execution of the recovery package 112.

To illustrate the function of the recovery software package 110, we continue with a brief example of an application including an abnormal software package. The recovery package sends a request for recovery instructions to the network system 130. The recovery package receives a set of recovery instructions from the network system 130. The recovery instructions include a modification to the computation logic of the abnormal software package associated with the failing function causing abnormal operation of the application 102 and instructions to execute the secondary application 114. The recovery software package 110 executes the recovery instructions recovering the application. Additional examples of determining abnormal function and recovering an application within the environment are discussed in more detail in regard to FIG. 2.

As an addition or an alternative, the recovery software package 110 determines that an application is operating abnormally based on consistent monitoring and analysis of operational requests. According to one example, generation of abnormal operational requests indicate that the application is operating abnormally. In this case, determining that the application is operating abnormally can include sending the generated operational requests to the network system 130 via the network 120 for analysis by the network system 130. In some embodiments, the recovery package 110 determines the application is functioning abnormally without accessing the network system 130. In addition to the generated operational requests, the application 102 may be determined to operate abnormally when the execution of those requests is unusual. In other embodiments, the recovery software package 110 can determine that an application is operating abnormally when an operational request is not executed after a certain amount of time, the response time of an executed operational request is abnormal (e.g., above or below a threshold), a generated operational request is repeatedly executed (e.g., an execution loop), a generated operational request is not executed, an executed operational request results in an abnormal response (e.g., querying the GPS of the device returns the device time), or any other analyses of an operational request that indicates the application is functioning abnormally. The failure determination component or module 142 can make similar determinations of abnormal operation in other embodiments.

Continuing with the client device of FIG. 1, the device data store 112 contains information associated with the device user, the client device 100, a user account, etc. This information can be accessed by the application 102 when providing the function of the application within the environment. Further, the information can be accessed, modified, or deleted when executing recovery instructions. In one embodiment, the information can be used to tailor software packages and operational requests to specific devices, user accounts, groups of devices and groups of user accounts (e.g., displaying output based on the screen size, inputting data based on a language setting, etc.). The information stored in the device data store can include: inter-device security metrics, intra-device security metrics, network security metrics, authentication protocols, user account information and preferences, client device information and preferences, device user information and preferences, a record of preferences and changes, and location based information, applications executing on the client device, software packages executing on the client device, modifications associated with software packages, expected and abnormal operational requests, and any other information associated with recovering an application in the environment.

As one example, the device data store 112 can store payment information for the device user 108. The function of the application 102 requires access to payment information, and the application can access the information in the device data store in response to an operational request. As another example, the device data store can store intra-device security metrics for the client device. The function of the application 102 requires access to the hardware configuration of the client device, and the application can access the configuration in response to an operational request based on the stored intra-device security metrics (e.g., prevent or allow access).

A client device 100 can communicate with other client devices and the network system within the environment using the network 120. The network 120 represents the communication pathways between the client devices 100 and the network system 130. In one embodiment, the network 120 is the Internet, but can also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The network system 130 assists in providing the function of an application 102 executing on client devices 100 and facilitates recovering applications 102 via the network 120. The network system 130 includes a recovery event module 140, a failure determination module 142, a recovery instruction module 144, a client device datastore 150, a software package datastore 152, and a recovery instruction datastore 154. The network system 130 can receive operational requests from an application on a client device. In response, the network system 130 can provide the requested operation. For example, the travel coordination application 120 sends an operational request to the network system 130 including a request for the location of the nearest travel provider. The network system 130 determines the location of the nearest provider and returns the information the requesting application on the client device 100. In addition, the network system 130 can receive a request for recovery instructions, determine a set of recovery instructions based on the request, and send the recovery instructions to the requestor.

The network system 130 comprises a number of "modules," which refers to hardware components and/or computational logic for providing the specified functionality. That is, a module can be implemented in hardware, firmware, and/or software (e.g., a hardware server comprising computational logic), other embodiments can include additional modules, can distribute functionality between modules, can attribute functionality to more or fewer modules, can be implemented as a standalone program or as part of a network of programs, and can be loaded into memory executable by processors.

The network system 130 can include a recovery event module 140. The recovery event module 140 interacts with the recovery software package 110 to provide recovery instructions for the application. Broadly, the recovery event module 140 receives a request for recovery instructions from a client device 100, sends the request to the failure determination module 142, receives a set of recovery instructions from the recovery instruction module 144 and sends the recovery instructions to the client device 100. In some embodiments, the recovery event module 140 is configured to communicate the recovery instructions to the client device 100 using the various network 120 pathways. For example, if the abnormally operating application is no longer able to receive the recovery instructions via a first communication protocol (e.g., in-application communication), the recovery event module 140 can provide the recovery instructions to the client device 100 via a second communication protocol (e.g., SMS message). In some embodiments, the recovery event module 140 sends recovery instructions to applications 102 similar to the requesting application, the similar application including software packages, or client device information associated with the determined recovery instructions.

The network system 130 can include a failure determination module 142 that receives recovery requests from the recovery event module 140. As previously described, the recovery requests can include an application manifest, a device manifest, operational requests, or any other information that can aid in determining a failing function of the application. The failure determination module determines a set of expected operational requests for the requesting client device based on the received recovery request. The failure determination module then identifies a failing function and its associated software packages based on the received recovery request, the expected set of operational requests, and actual operational requests received from the client device providing the function. The failure determination module also identifies abnormal software packages from the associated software packages that cause the failing function. Various methods for determining a failing functions and associated software packages are described herein.

In one embodiment, the failure determination module 142 can determines failing functions and abnormal software packages by analyzing the differences between expected and abnormal operational requests. That is, the failure determination module determines (or accesses) the expected operational requests of the application and compares it to the received operational requests of the application. Based on the differences between the expected operational requests and received operational requests (i.e. abnormal operational requests) the failure determination module determines that the application includes a failing function. In this example, all of the software packages associated with the received operational requests may be abnormal software packages.

In another embodiment, the failure determination 142 module can determine a failing function by analyzing the received operational requests. In this case, the failure determination module determines abnormal operational requests similar to the previous example. However, in this example, the failure determination module determines a list of software packages from the application manifest that are associated the abnormal operational requests. In some examples, the software packages can be accessed from the software package datastore or the client device datastore. The failure determination module analyzes the list of software packages associated with the abnormal operational requests and determines which software packages in the list are most likely causing the failing function. The determination of the software package that is causing the abnormal function can include scoring each software package based on any of: the number of abnormal operational requests, the severity of the abnormal operational requests, how recently a software package was installed, etc.

In another embodiment, the failure determination module determines a failing function and its associated software package(s) based on a static analysis of the software packages included in the application manifest of the received request. In one variation, the software packages are stored in the software package datastore 152. The static analysis analyzes the software packages and determines the operational requests that can be generated by each software package when executed by the application. In some cases, the static analysis further analyzes the software packages and determines how the executing software packages can generate any combination of expected and abnormal operational requests (e.g., user input errors, variable changes, unexpected software package interaction, software bugs, etc.). Based on the static analysis the failure determination module can identify a failing functions and their associated software packages.

In another embodiment, the failure determination module 142 can access the client device datastore and compare the received operational requests and software packages from the requesting client device to the software packages and expected operational requests of an alternate client device within the environment. For example, the failure determination module has previously determined that an alternate device is operating nominally in the environment. The failure determination module can compare the expected operational requests of the alternate device to the received operational requests of the requesting device. Based on a comparison of the differences between the expected/received operational requests the failure determination module determines that the received operational requests are abnormal. Further, based on the associated application and device manifests of the alternate/requesting devices, the failure determination module can determine the failing function and the associated software packages that cause the abnormal operation requests. A similar analysis can be made if the alternate client device is operating abnormally, the failure determination module can determine similar software packages between the client devices that can cause the abnormal operation.

By these various means, the failure determination module 142 can determine a failing function of the application based on any of the software packages executing on the requesting application, the associated set of expected operational requests and abnormal operational requests (if any), or any other information associated with the recovery request. Similarly, as each software package is associated a failing function, the failure determination module can determine software packages 104 that can be causing the failing function. These software packages are identified as candidate software packages for recovery instructions to recover the application by affecting operation of one or more of the candidate software packages.

The network system can also include a recovery instruction module 144. The recovery instruction module 144 receives the failing function from the failure determination module 142. Consequently, the recovery instruction module 144 determines a set of recovery instructions associated with the determined failing function to recover the functionality of the application 102 requesting the set of recovery instructions. The determination of the set of recovery instructions for the candidate software package(s) can be based on the operational requests received from the requesting application 102, the application manifest, the device manifest, the candidate software packages, information received stored in the client device database, recovery instructions and information stored in the recovery instruction database 154, or any other information in the environment that can aid in recovering the application.

In general, the recovery instructions may be selected for the application based on the prior operational requests of the application and on prior recovery instructions. When the application operates normally, the recovery instructions may provide no modification or change to the application. When there is not normal operation, the recovery instructions may select instructions that impact the application's operation or impact a user to varying degrees. For example, providing a recovery instruction that disables a software package may create a lower impact on a user experience than deleting cached data or requiring a user to re-enter log-in or causing a secondary application to provide instructions to a user. Accordingly, the recovery instructions may escalate the level of impact of the recovery instructions according to prior recovery instructions. To attempt to automatically cure a problem caused by the software packages, the recovery instruction module 144 may determine which software modules to affect with the recovery instructions.

In one embodiment, the recovery instruction module 144 can access the determined candidate software packages recovery event module to determine a set of recovery instructions. In this case, the recovery instructions may be one of a list of recovery instructions stored in the recovery instruction datastore. Each set of recovery instructions in the list may be previously associated with failing functions and candidate software packages.

In another embodiment, the recovery instruction module selects a single candidate software package for several candidate as the abnormal software package to correct based on information received in the request for recovery instructions. In this embodiment, the recovery instruction module may be configured to only correct one candidate software package per set of recovery instructions rather than correcting multiple software packages simultaneously.

In another example, the set of recovery instructions sent to the requesting application 102 can be a set of recovery instructions stored in the recovery instruction datastore 154 associated with the candidate software packages 104. The recovery instruction module 144 can modify the set of stored recovery instructions based on the determined failing function and the recovery request. The recovery instruction module 144 can send the modified set of recovery instructions to the application 102 requesting the set of recovery instructions. In another embodiment, the set of recovery instructions can be a set of recovery instructions previously provided to an application executing similar software packages and modifications and stored in the recovery instruction datastore 154.

In another embodiment, a set of recovery instructions provided to the client device 100 maintains the client device and the client device continues operate abnormally. The client device again sends a recovery request to the network system 130. Here, the network system 130 may determine a similar set of recovery instructions to the previous set of recovery instructions provided to the client device. In this case, the recovery instruction module 144 can determine the operational requests received from the client device have not changed and generate a new set of recovery instructions for recovering the application.

The network system can include a client device datastore, software package datastore, and recovery instruction datastore. The client device data store can store information associated with the client devices such as: executing software packages, executing modifications, user information, client device information, operational requests associated with any of the stored information, and functions associated with any of the stored information. The software package datastore can include all of the software packages 104 and modifications 106 associated with the application 102. The recovery instruction datastore 154 can include all of the recovery instructions associated with recovering functionality of the application 102.

Application Recovery

FIG. 2 is a table illustrating examples of processes the network system 130 and client devices can take to recover an application.

To begin, all of the illustrated client devices 102 are executing the application 102. The applications can provide the functions 220 "A," "B," and "C," in the environment. As a first example, the executing application provides the function 210 "A" when Vince uses the interface of the application 102 on his client device 100a. Vince's client device 100a includes the software packages 220 "1" and "2" associated with the function "A". The recovery software package 110 requests 230 a set of recovery instructions from the network system 130. In one example, the request includes the device profile (i.e. hardware configurations, etc.), and the application profile (i.e. installed software packages, etc.). In some embodiments, the request can include expected operational requests and abnormal operational requests as determined by the recovery software package. The network system determines a set of expected operational requests 240 "θ" associated with the function 210 "A" and the software packages "1" and "2". Vince's client device generates the actual operational requests 250 "α" when the software packages "1" and "2" are executed by the application. Thus, the network system 130 determines that the actual operational requests "α" are abnormal operational requests. The network system 130 uses the failure determination module 142 and recovery instructions module 144 to determine a set of recovery instructions 260 "Φ" for recovering the application based on the recovery request and the determined abnormal function and associated software packages.

To continue, the executing application provides the function 210 "A" when Alice uses the interface of the application. The application 102 executing on Alice's client device 100b includes the software package 220 "1" associated with the function "A". The recovery software package 110 requests 230 a set of recovery instructions form the network system 130. In this instance, the network system 130 determines that there are no expected 240 operational requests associated with the function "A" and the software package "1". Alice's client device 100b generates the actual operational requests 250 "γ" when the software package "1" is executed by the application. Thus, the actual operational requests "γ" are abnormal operational requests and the network system 130 determines abnormal function of the application. The network system 130 uses the failure determination module 142 and recovery instructions module 144 to determine a set of recovery instructions 260 "Δ" for recovering the application based on the received recovery request and the determined abnormal function and associated software packages.

In another example, the executing application provides the functions 210 "A" and "B" when Nick uses the interface of the executing application. The application executing on Nick's client device 100c includes the software packages 220 "1" and "3" associated with the functions "A" and "B". The recovery software package 110 requests 230 a set of recovery instructions from the network system 130. The network system 130 determines a set of expected operational requests 240 "θ" associated with the functions "A" and "B" and the software packages "1" and "3". Nick's client device 100c does not generate actual operational requests 240 when the software packages "1" and "3" are executed by the application. In this case, the absence of generated operational requests indicate abnormal operational requests and the network system determines abnormal function of the application. The network system uses the failure determination module 142 and recovery instructions module 144 to determine a set of recovery instructions "Φ" for recovering the application based on the received recovery requests and the determined abnormal function and associated software packages.

Finally, the executing application provides the function 210 "C" when Mary uses the interface of the application. Mary's client device 100d includes the software package "2" associated with the function "C". The recovery software package 110 requests 230 a set of recovery instructions from the network system 130. The network system determines a set of expected 240 operational requests "α" when the software package "2" is executed by the application. Mary's client device generates a set of actual operational requests 240 "α" when the software package "2" is executed by the application. In this example, there are no abnormal operational requests. The network system 130 determines that the function "C" is nominal and does not determine 260 a set of recovery instructions to Mary's client device.

The situations described in FIG. 2 are provided as examples. Note that any number of devices, functions, software packages, operational requests and recovery instructions can be used to recover an application.

Figure 3:
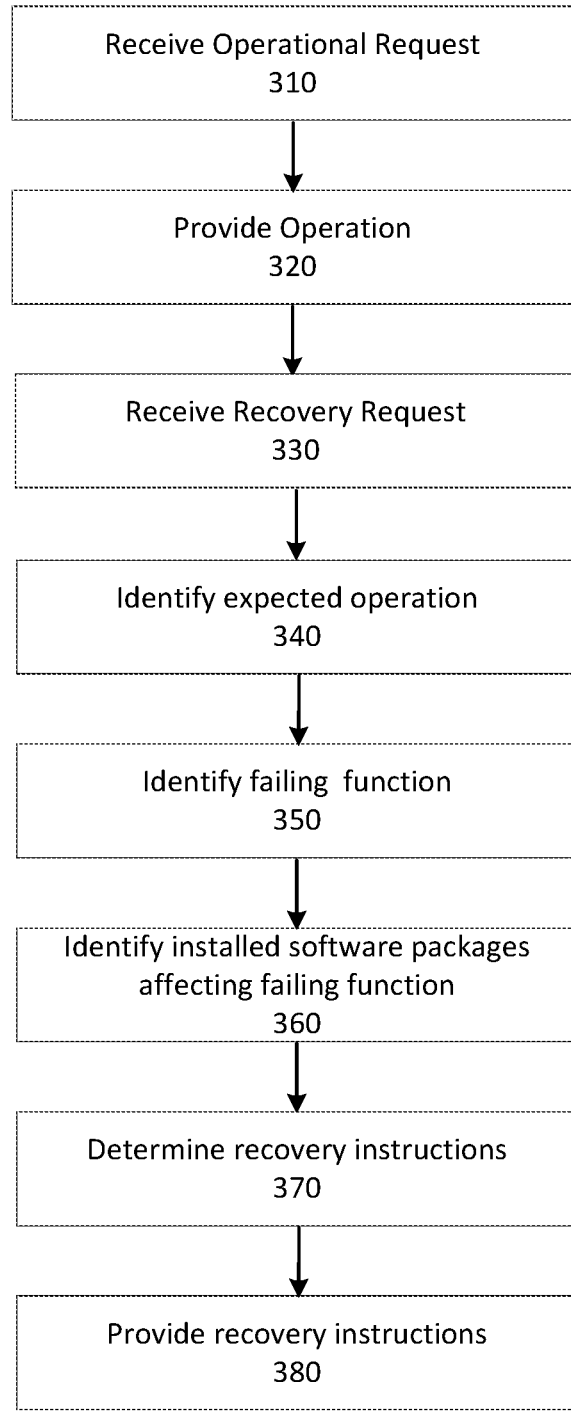
FIG. 3 is a flowchart illustrating a method for a network system to recover an application, in accordance with some embodiments.

FIG. 3 is a data flow diagram illustrating a data flow that demonstrates recovery of an application, in accordance with some embodiments. Alternate embodiments of FIG. 3 may include more, fewer, or different steps, and the steps may be performed in an order different from what is illustrated in FIG. 3 and described herein. In one embodiment, the data flow of FIG. 3 can occur on the network system 130, but can occur on any element or combination of elements within the environment.

To begin, a client device is executing an application and functioning nominally. When the application is providing nominal function, the network system receives 310 operational requests from the client device via the network. The network system provides 320 responses to the operational requests to the client device based on the requests. In this embodiment, the network system 312 services the operational requests from the client device and may thus analyze the operational requests it receives. Additional operational requests for analysis may also be received from other systems that service operational requests from the application and operational requests within the client device may be provided by a recovery request.

The network system 130 receives 330 a recovery request via the network 120 from a recovery package of a client device 100 executing an application, for example when the application loads the recovery package or when the recovery package identifies abnormal functioning of the application. The request can include information about the application and client device including operational requests, a device manifest, an application manifest, and information from the client device datastore. The failure determination module identifies 340 the expected operation of the client device. Identifying 340 the expected operation of the client device can include determining the set of expected operational requests and abnormal operational requests in any of the methods previously described.

Continuing, the failure determination module identifies 350 the failing function based on the identification of the expected operational requests and the abnormal operational requests. The failure determination module identifies 360 the installed software packages affecting the failing function based on the identified failing function, the received recovery request, the abnormal operational requests, and the expected operational requests.

The recovery instruction module determines 370 a set of recovery instructions based on the identified failing function, the operational requests, and the received request. Concluding, the recovery event module provides 380 the determined recovery instructions to the requesting client device.

Figure 4:
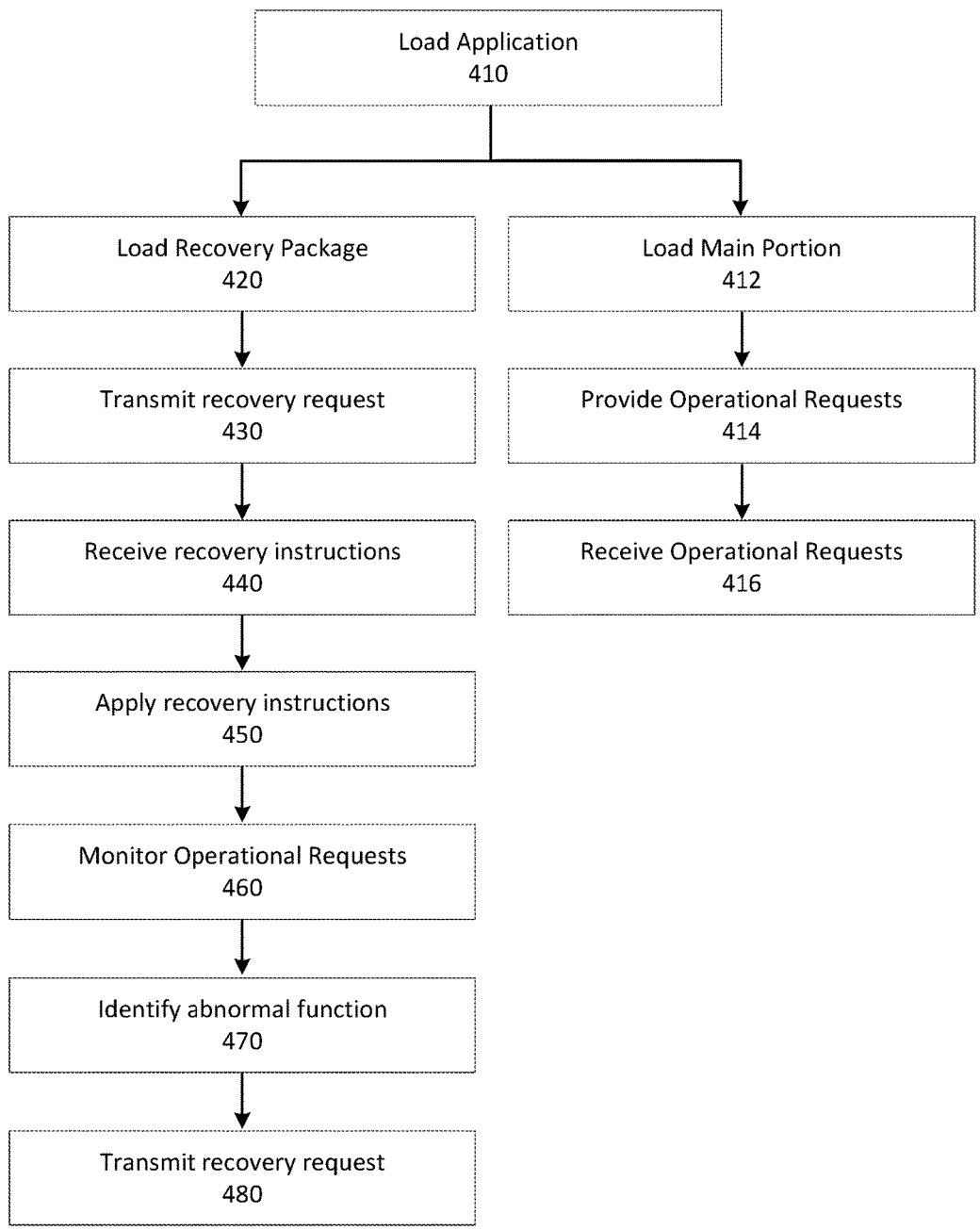
FIG. 4 is a flowchart illustrating a method for a client device to recover an application, in accordance with some embodiments.

FIG. 4 is a data flow diagram illustrating a data flow from for recovering functionality of an application, in accordance with some embodiments. Alternate embodiments of FIG. 4 may include more, fewer, or different steps, and the steps may be performed in an order different from what is illustrated in FIG. 4 and described herein. Generally, the data flow of FIG. 4 can occur on the client device 100, but can occur on any element or combination of elements within the environment.

To begin, a client device loads 410 an application. The application loads the recovery software package 420 and the main portion of the application 412 with its associated software packages. The main portion of the application and the associated software packages provide 414 operational requests to the server and receives 416 operations in return.

The recovery software package transmits 430 a recovery request to the network system including the device profile and application profile. In response, the recovery software package receives 440 a set of recovery instructions from the network system (if necessary). The recovery software package applies 450 the recovery instructions to the application to recover functions of the application.

In some embodiments, the recovery software package monitors 460 the generated operational requests of the main portion of the application as it generates operational requests associated with those functions. As previously described, the recovery software package can identify 470 abnormal function of the application and transmit 480 a recovery request to the network system based on the identified abnormal functions of the application.

Figure 5:
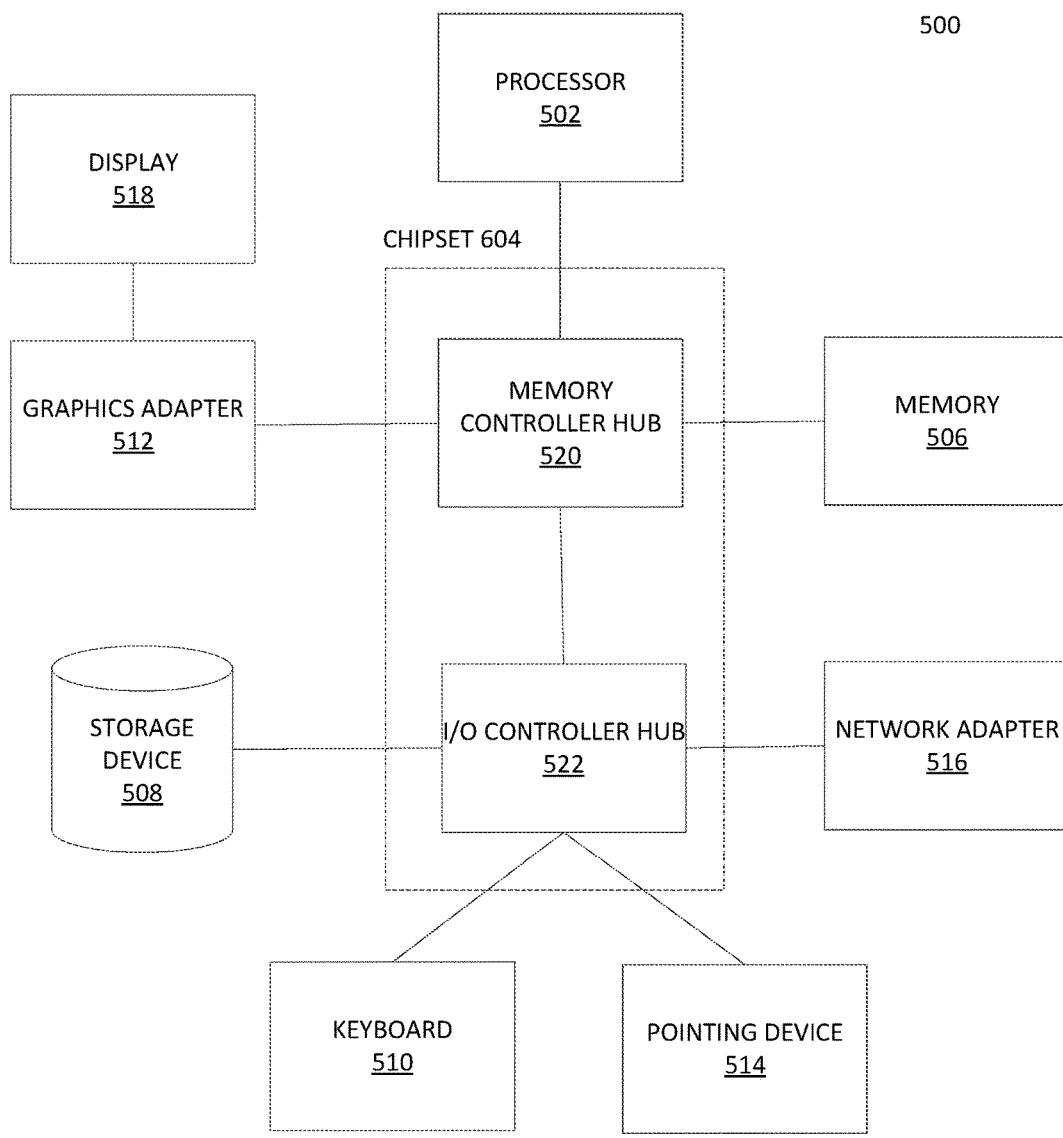
FIG. 5 is an illustration of a machine for reading and executing instructions from a machine-readable medium, in accordance with some embodiments.

FIG. 5 is a block diagram illustrating components of an example machine for reading and executing instructions from a machine-readable medium. Specifically, FIG. 5 shows a diagrammatic representation of system 130 and client device 100 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 506 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include the functionalities of modules of the system 130 described in FIG. 2. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Alternative Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses predicting provider involvement in potential safety incidents, the methods and systems herein can be used more generally for any purpose where one would want to predict involvement in potential incidents using a machine learning model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for recovering functionality of an application, the method comprising:
    receiving a request, by a network system, for recovery instructions from a device that is (i) remote from the network system and (ii) executing an application having a main portion and a recovery portion, the request generated by the recovery portion of the application and specifying a set of software packages affecting operation of the main portion of the application;
    identifying a set of operational requests reflecting operation of the set of software packages affecting the main portion of the application, the set of operational requests including an abnormal operational request received from an abnormal software package of the set of software packages;
    identifying a set of candidate software packages associated with the abnormal operational request;
    determining the abnormal software package is a software package affecting the main portion of the application by comparing (i) the set of candidate software packages and the set of operational requests of the device, to (ii) a second set of candidate software packages and a second set of operational requests received from a second device;
    determining a set of recovery instructions for modifying the main portion of the application based, at least in part, on the abnormal software package and a difference between (i) the set of operational requests reflecting operation of the set of software packages affecting the main portion of the application, and (ii) a set of expected operational requests reflecting expected operation of the set of software packages affecting the main portion of the application; and
    providing the set of recovery instructions to the device.

2. The method of claim 1, wherein identifying the set of candidate software packages associated with the abnormal operational request comprises:
    performing a static analysis of the main portion of the application to identify a set of candidate operational requests affected by the set of candidate software packages; and
    identifying the abnormal software package from the set of candidate software packages based on at least a difference between the set of operational requests affecting the main portion of the application and the set of candidate operational requests associated with the set of candidate software packages.

3. The method of claim 1, wherein when the second device is operating nominally, the comparison identifies a software package on the device as the abnormal software package based on a device manifest for the device and a device manifest for the second device.

4. The method of claim 1, wherein when the second device is operating abnormally, the comparison identifies a software package executing on the device and the second device as the abnormal software package.

5. The method of claim 1, further comprising:
    identifying the set of expected operational requests reflecting expected operation of the set of software packages affecting the main portion of the application based on one or more functions executed by the set of software packages; and
    wherein determining the set of recovery instructions is further based on the one or more functions.

6. The method of claim 1, wherein the set of recovery instructions includes instructions for executing a second application installed on the device.

7. The method of claim 1, wherein modifying the set of recovery instructions comprises:
    identifying a set of previously provided recovery instructions; and
    wherein the set of recovery instructions is based on the previously provided recovery instructions.

8. The method of claim 1, wherein determining the set of recovery instructions comprises:
    determining a set of devices executing the application with a set of software packages that includes at least one software package that is also installed on the application of the device; and
    sending the set of recovery instructions to the set of devices.

9. A non-transitory computer-readable storage medium storing computer program instructions executable by a processor of a system to:
    receive a request, by a network system, for recovery instructions from a device that is (i) remote from the network system and (ii) executing an application having a main portion and a recovery portion, the request generated by the recovery portion of the application and specifying a set of software packages affecting operation of the main portion of the application;
    identify a set of operational requests reflecting operation of the set of software packages affecting the main portion of the application, the set of operational requests including an abnormal operational request received from an abnormal software package of the set of software packages;
    identify a set of candidate software packages associated with the abnormal operational request;
    determine the abnormal software package is a software package affecting the main portion of the application by comparing (i) the set of candidate software packages and the set of operational requests of the device, to (ii)

a second set of candidate software packages and a second set of operational requests received from a second device;

determine a set of recovery instructions for modifying the main portion of the application based, at least in part, on the abnormal software package and a difference between (i) the set of operational requests reflecting operation of the set of software packages affecting the main portion of the application, and (ii) a set of expected operational requests reflecting expected operation of the set of software packages affecting the main portion of the application; and provide the set of recovery instructions to the device.

10. The non-transitory computer-readable storage medium of claim 9, wherein identifying the set of candidate software packages associated with the abnormal operational request, further causes the processor to:

perform a static analysis of the main portion of the application to identify a set of candidate operational requests affected by the set of candidate software packages; and identify the abnormal software package from the set of candidate software packages based on at least a difference between the set of operational requests affecting the main portion of the application and the set of candidate operational requests associated with the set of candidate software packages.

11. The non-transitory computer-readable storage medium of claim 9, wherein when the second device is operating nominally, the comparison identifies a software package executing on the device as the abnormal software package based on a difference between a device manifest for the device and a device manifest for the second device.

12. The non-transitory computer-readable storage medium of claim 9, wherein when the second device is operating abnormally, the comparison identifies a software package executing on the device and the second device as the abnormal software package.

13. The non-transitory computer-readable storage medium of claim 9, wherein the instructions further cause the processor to:

identify the set of expected operational requests reflecting expected operation of the set of software packages affecting the main portion of the application based on one or more functions executed by the set of software packages; and wherein determining the set of recovery instructions is further based on the one or more functions.

14. The non-transitory computer-readable storage medium of claim 9, wherein the set of recovery instructions includes instructions for executing a second application installed on the device.

\* \* \* \* \*